United States Patent [19]

Hisanaga

[11] Patent Number: 5,886,880
[45] Date of Patent: Mar. 23, 1999

[54] POWER CIRCUIT FOR TRANSFERRING ENERGY BY ALTERNATELY SWITCHING WINDING CIRCUITS OF A TRANSFORMER AT HIGH SPEED

[75] Inventor: Koji Hisanaga, Tokyo, Japan

[73] Assignee: NEC Corporation, Tokyo, Japan

[21] Appl. No.: 84,909

[22] Filed: May 28, 1998

[30] Foreign Application Priority Data

May 28, 1997 [JP] Japan .................................. 9-138603

[51] Int. Cl.⁶ ....................................................... H02J 9/00
[52] U.S. Cl. ............................... 363/20; 307/66; 363/16; 363/50
[58] Field of Search ................................. 363/16, 20, 21, 363/34, 50; 307/46, 48, 51, 64, 66

[56] References Cited

U.S. PATENT DOCUMENTS 4,745,299  5/1988  Eng et al. ............................. 363/21 X
4,843,535  6/1989  Fuchs .................................. 307/66 X

FOREIGN PATENT DOCUMENTS 3-98431  4/1991  Japan .

Primary Examiner—Peter S. Wong
Assistant Examiner—Y. J. Han
Attorney, Agent, or Firm—Foley & Lardner

[57] ABSTRACT

In a power supply unit, AC energy is converted to DC energy and stored into a first capacitor to which a first winding of a transformer is connected. An anti-parallel circuit of a first transistor and a diode is connected between the first capacitor and the first winding. An anti-parallel circuit of a second transistor and a diode is connected between a second winding of the transformer and a second, battery-charging capacitor. A current is induced in a third winding of the transformer for charging a third capacitor when a current is produced in the first winding in a particular direction or when energy stored in the second winding is released into the third winding. The first and second transistors are alternately switched on so that energy is transferred from the first capacitor to the second and third capacitors when the AC energy is normal and energy is transferred from the battery to the third capacitor when the AC energy fails.

5 Claims, 2 Drawing Sheets

POWER CIRCUIT FOR TRANSFERRING ENERGY BY ALTERNATELY SWITCHING WINDING CIRCUITS OF A TRANSFORMER AT HIGH SPEED

BACKGROUND OF THE INVENTION

1. Field of the Invention

The present invention relates generally to power supply circuits for transferring energy from a first windint to second and third windings of a transformer for charging a battery when AC power is normal and transferring energy of the battery from the second winding to a third winding when the AC power fails.

2. Description of the Related Art

In a prior art uninterrupted power supply unit disclosed in Japanese Laid-Open Patent Specification Hei-3-98431, a first capacitor which is normally charged with DC energy is repeatedly discharged at high frequency into the first winding of a transformer to induce a high-frequency current in a secondary winding, where it is rectified to charge a second capacitor as well as in a backup winding. A battery connected to the backup winding is charged by a rectified current of the backup winding. When the mains supply power fails, the battery is repeatedly discharged into the backup winding to induce a high frequency current in the secondary winding. To perform switching from the normal mode to the battery discharge mode, a power failure detector and a mechanical switching circuit are provided. When the power fails, the detector operates the switching circuit to deactivate the first winding and activate the backup winding to produce high-frequency oscillations.

However, the use of a mechanical switch is unfavorable from the manufacturing point of view because of the recent tendency toward using all electronic circuitry. Furthermore, the power failure detector represents an extra cost and added complexity.

SUMMARY OF THE INVENTION

It is therefore an object of the present invention to provide a simple and yet effective solution to the problems associated with power supply circuits.

According to a first aspect of the present invention, there is provided a power supply unit comprising a rectifier for converting alternating-current energy to direct-current energy, a transformer having a first winding wound in a first direction, a second winding wound in a second direction opposite to the first direction, and a third winding wound in the first direction. A first loop circuit is formed by the first winding, a first capacitor and an anti-parallel circuit of a first switching transistor and a first diode, the first capacitor being connected across the rectifier. A second loop circuit is formed by the second winding, a second capacitor and an anti-parallel circuit of a second switching transistor and a second diode, the second capacitor being connected to a battery. A power delivery circuit connected to the third winding for receiving a current induced in the third winding when a current is produced in the first winding in a particular direction or when energy stored in the second winding is released into the third winding, and charging a third capacitor with the received current. A pulse generating circuit is provided for alternately driving the first and second switching transistors so that energy is transferred from the first capacitor to the second and third capacitors when the first capacitor is charged by the rectifier and energy is transferred from the battery to the third capacitor when the first capacitor is not charged by the rectifier.

According to a second aspect, the present invention provides an energy transfer method using a transformer having using a transformer having first, second and third windings, and first, second and third capacitors respectively associated with the first, second third windings. Alternating-current energy is converted to direct-current energy and the first capacitor is charged with the direct-current energy. In a first step, the first capacitor is discharged through the first winding and a current is induced the third winding to charge the third capacitor and energy is stored in the first winding. In a second step, the stored energy is released into the second winding to charge the second capacitor. The first and second steps are repeated until the energy released by the first winding becomes insufficient to charge the second capacitor. In a third step, the second capacitor is discharged through the secondary winding and energy is stored in the second winding if the energy released by the first winding becomes insufficient to charge the second capacitor. In a fourth step, the stored energy of the second winding is released into the third winding to charge the third capacitor. The third and fourth steps are repeated until energy stored in the first capacitor becomes sufficient to cause the first winding to release sufficient energy to charge the second capacitor.

BRIEF DESCRIPTION OF THE DRAWINGS

The present invention will be described in further detail with reference to the accompanying drawings, in which.

DETAILED DESCRIPTION

Figure 1:
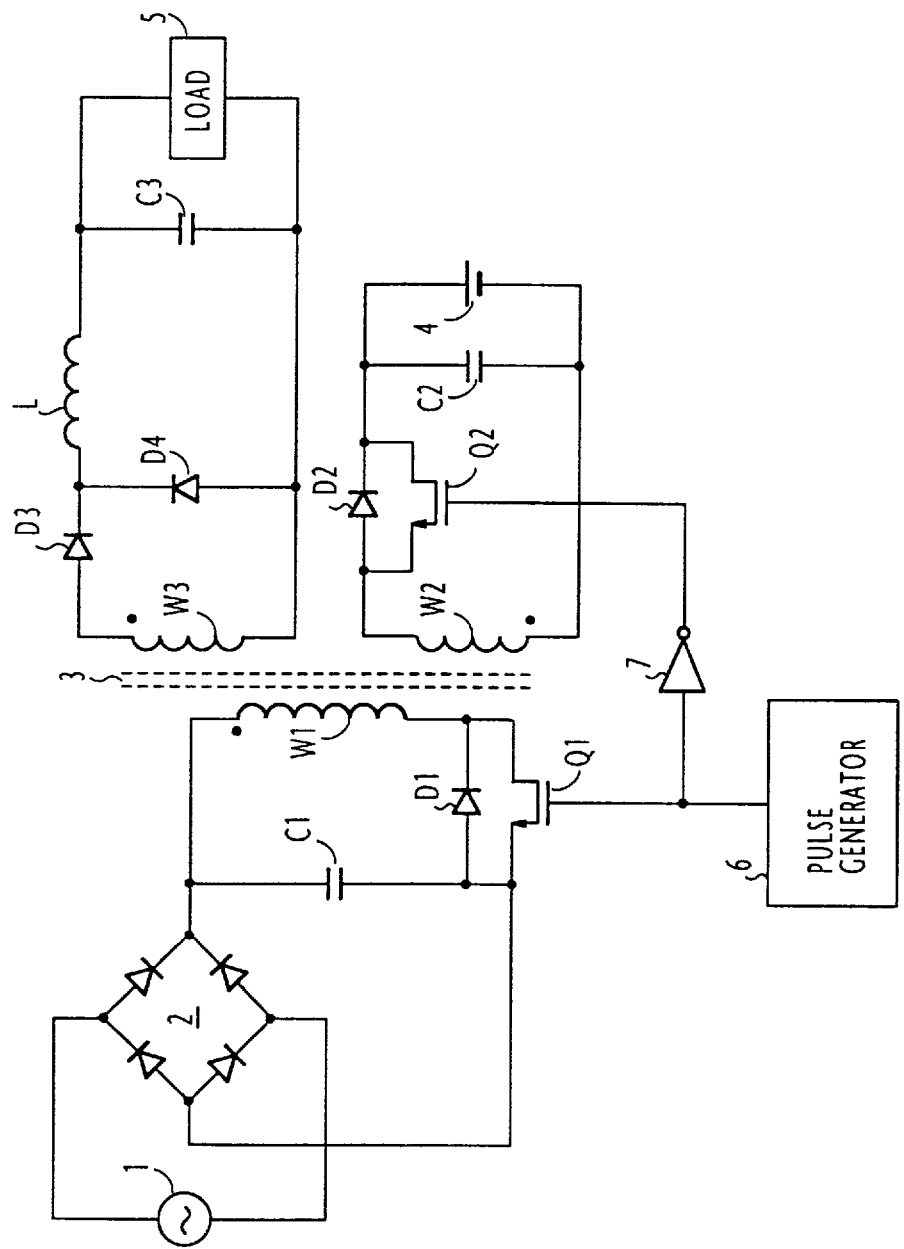
FIG. 1 is a circuit diagram of an uninterrupted power supply unit according to the present invention.

Referring to FIG. 1, there is shown an uninterrupted power supply unit according to the present invention. The mains AC supply voltage from a commercial power outlet 1 is rectified by a full-wave rectifier 2 and charges a smoothing capacitor C1 to develop a DC voltage. A transformer 3 is provided having a primary winding W1 connected in series with a switching transistor Q1 with the capacitor C1. A diode D1 is connected in anti-parallel relationship with the transistor Q1.

Transformer 3 has two secondary windings W2 and W3 which are wound in the opposite directions to each other, with the direction of the winding W2 being opposite to the direction of the winding W1 and the direction of the winding W3 being the same as the direction of the winding W1. Secondary winding W2 is connected in series to a switching transistor Q2 and a smoothing capacitor C2. A diode D2 is connected in anti-parallel relationship with the transistor Q2. A rechargeable battery 4 is connected across the smoothing capacitor C2.

Secondary winding W3 is connected in series to a diode D3, an inductor L and a smoothing capacitor C3. Diode D3 is connected in such a sense that the capacitor C3 is charged with a current induced in the winding W3. A flywheel diode D4 is connected across the inductor L and the capacitor C3 to allow current in the inductor L to flow in the charging direction of the capacitor C3 due to the flywheeling effect of the inductor. A load circuit 5 is connected across the capacitor C3.

A pulse generator 6 is provided for producing high frequency pulses. Transistor Q1 directly receives the output of the pulse generator 6 and the transistor Q2 receives it through an inverter 7. Therefore, the transistors Q1 and Q2 are alternately switched on in response to the high frequency pulses.

Figure 2:
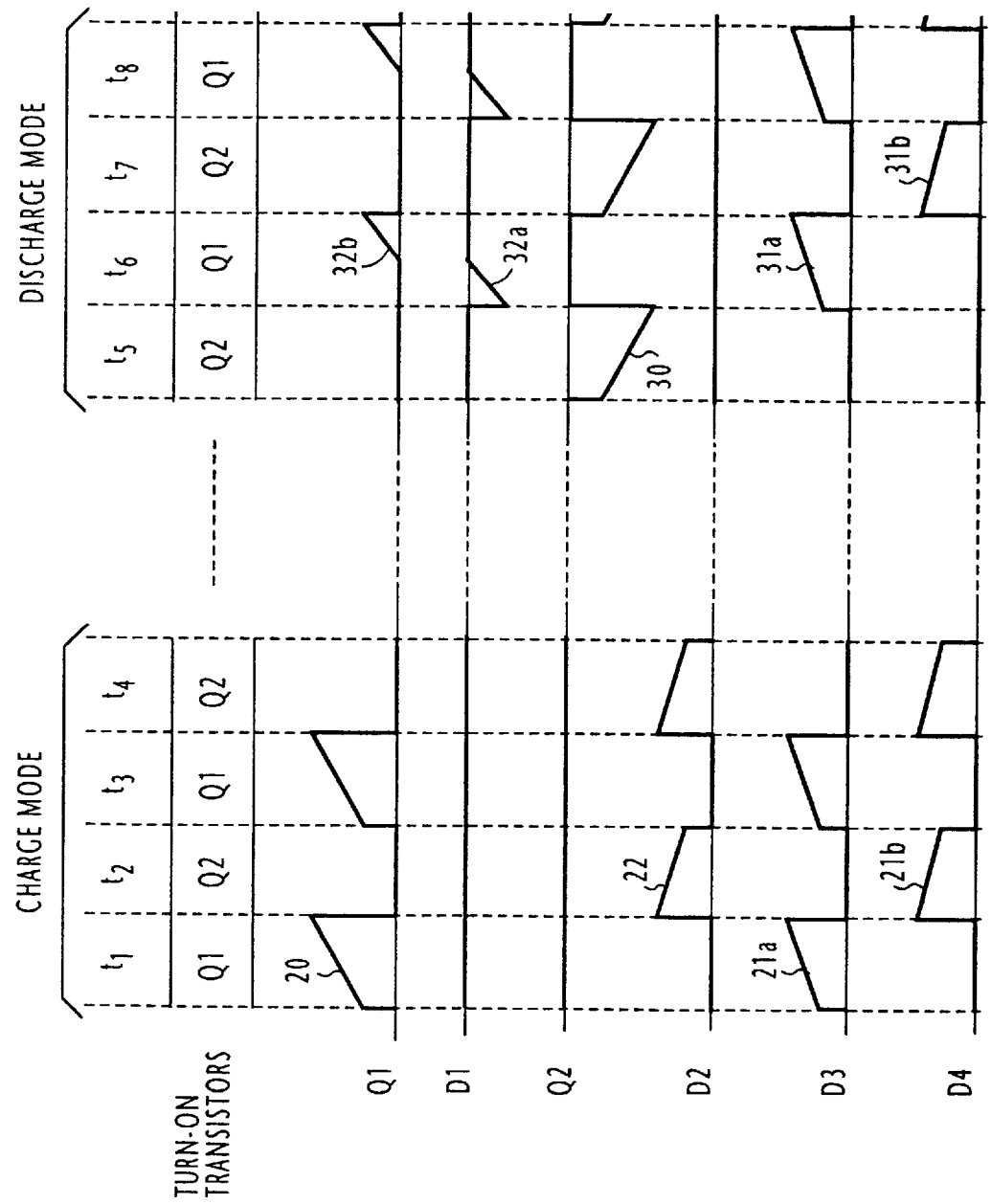
FIG. 2 is a timing diagram for explaining the operation of the present invention.

The operation of the circuit of FIG. 1 proceeds as illustrated in FIG. 2.

When the mains AC current is normal, the capacitor C1 is fully charged by the current rectified by the full-wave rectifier 2. Turn-on of the transistor Q1 during period $t_1$ causes the capacitor C1 to discharge its energy, producing a current 20 through the transistor Q1 into the primary winding W1. This current increases linearly with time until the transistor Q1 is turned off. Diode D3 is forward-biased to induce a current 21a in the winding W3 which flows through the inductor L into the smoothing capacitor C3. Since the transistor Q2 is in an OFF state and the diode D2 is reverse-biased, the winding W2 is open-circuited so that magnetic energy is stored in the primary winding W1 when the transistor Q1 is turned off.

When the transistor Q1 is turned off at the beginning of period $t_2$, the energy stored in the winding W1 is released. Since the windings W1 and W3 are wound in the same direction to each other, but opposite to the direction of the winding W2, the diode D2 is forward-biased and the diode D3 is reverse-biased at this moment. The energy stored in the primary winding W1 is therefore fully released into the secondary winding W2 and converted into a current 22 flowing through the diode D2 and charges the capacitor C2. Since this energy is sufficient to charge the battery, no current flows through the transistor Q2 during period $t_2$. On the other hand, the diode D4 is forward-biased due to the flywheeling effect of the inductor L so that current 21b continues to flow into the capacitor C3. Capacitor C3 is thus charged with currents 21a and 21b to develop a DC voltage.

Similar events occur in subsequent periods $t_3$ and $t_4$ when the mains AC supply is normal and the uninterrupted power supply unit operates in a charging mode. In this way, DC energy is transferred from the capacitor C1 to the capacitors C2 and C3 and energy is withdrawn by the load circuit 5 from the capacitor C3. During this charging mode, the transistor Q2 carries no current and plays no particular role. It comes into play when the amount of the energy released by the primary winding W1 is not sufficient to release energy in the winding W2 for charging the battery 4.

When the mains AC power is shut down or falls below some critical level, the voltage across the capacitor C1 begins to drop and the energy stored on the primary winding W1 will become insufficient to release energy in the winding W2 to charge the battery 4. When this occurs, the power supply unit enters a discharging mode.

During period $t_5$, turn-on of the transistor Q2 causes a current 30 to be withdrawn from the capacitor C2 (i.e., battery 4) into the secondary winding W2. Since the transistor Q1 is in the OFF state and the diodes D1 and D3 are reverse-biased, energy is stored in the winding W2 when the transistor Q2 is turned off at the end of the period $t_5$.

Transistor Q1 is switched ON at the beginning of period t6. Since the windings W2 and W3 are wound on opposite directions to each other, the diodes D1 and D3 are forward-biased, so that the energy stored in the winding W2 is released into the windings W1 and W3. The turns ratios of the windings W1, W2 and W3 are such that a greater amount of the energy stored in the winding W2 is released into the winding W3 and converted into a current 31a flowing through the diode D3 than the amount of energy released into the primary winding W1, which is converted into a current 32a flowing through the diode D1. The energy induced in the primary winding W1 causes an opposite current 32b in the conducting transistor Q1.

During period $t_7$, turn-off of the transistor Q1 causes the current 31a to continue flowing through the inductor L, producing a current 31b through the diode D4 and the current 30 is discharged from the battery 4 into the winding W2 through the diode D2. As a result, the capacitor C3 is charged with currents 31a and 31b during the discharging mode.

Similar events occur in subsequent periods $t_7$ and $t_8$ when the mains AC supply is abnormal and the uninterrupted power supply unit operates in a discharging mode. In this way, DC energy is transferred from the battery 4 to the capacitor C3.

The operation of this invention is described in quantitative terms as follows.

Let $V_L$ and $V_B$ represent the DC voltages developed across the load circuit 5 and the battery 4, respectively. These voltages are given by the following equations:

$$V_L = E \cdot D \cdot N_{S1}/N_P \tag{1}$$

$$V_B = E \cdot \{D/(1-D)\} N_{S2}/N_P \tag{2}$$

where,

E=the voltage across capacitor C1,

D=the duty ratio of the pulse produced by pulse generator 6, $N_P$=the turns ratio of primary winding W1, $N_{S1}$=the turns ratio of secondary winding W3, $N_{S2}$=the turns ratio of secondary winding W2.

Equations (1) and (2) can be rearranged to give the following relation between $V_L$ and $V_B$.

$$V_L = V_B \cdot (N_{S1}/N_{S2})(1-D) \tag{3}$$

When the mains AC supply fails, the voltage E replenished by the battery 4 across the capacitor C1 is given by:

$$E = V_B \cdot (N_P/N_{S2})(1-D)/D \tag{4}$$

By substituting Equation (1) into Equation (4), the following relation holds:

$$V_L = V_B \cdot (N_{S1}/N_{S2})(1-D) \tag{5}$$

Since Equation (5) is identical to Equation (3), the same DC energy can be transferred to the load circuit 5 during the power outage as when the mains power is normal.

What is claimed is:

1. A power supply unit comprising:

a rectifier for converting alternating-current energy to direct-current energy;

a transformer having a first winding wound in a first direction, a second winding wound in a second direction opposite to the first direction, and a third winding wound in the first direction;

a first loop circuit comprising said first winding, a first capacitor and an anti-parallel circuit of a first switching transistor and a first diode, said first capacitor being connected across said rectifier;

a second loop circuit comprising said second winding, a second capacitor and an anti-parallel circuit of a second switching transistor and a second diode, said second capacitor being connected to a battery;

a power delivery circuit connected to said third winding for receiving a current induced in the third winding when a current is produced in the first winding in a particular direction or when energy stored in the second winding is released into the third winding, and charging a third capacitor with the received current; and a pulse generating circuit for alternately driving said first and second switching transistors so that energy is transferred from the first capacitor to the second and third capacitors when the first capacitor is charged by the rectifier and energy is transferred from the battery to the third capacitor when the first capacitor is not charged by the rectifier.

2. A power supply unit as claimed in claim 1, wherein said power delivery circuit comprises:

a third diode connected to a terminal of said third winding so that the third diode is forward-biased when the first transistor is switched on to produce a current;

an inductor connected to the third diode for allowing said current to flow into the third capacitor; and a fourth diode connected between said third diode and an opposite terminal of the third winding, said third capacitor being connected between the inductor and an opposite terminal of said third winding, whereby the fourth diode causes said inductor to continue to flow said current into the third capacitor when said second transistor is switched on.

3. A power supply unit as claimed in claim 2, wherein the arrangement is such that, when the first switching transistor is switched on, a current is produced in the first winding, energy is stored therein and said third diode is forward-biased to induce a current in the third winding in response to the current in the first winding;

when the first switching transistor is switched off, said third diode is reverse-biased and said second diode is forward-biased to release the energy stored in the first winding into the second winding, when the second switching transistor is switched on during the time the first capacitor is not charged by the rectifier, a current is withdrawn from the battery into the second winding, and said first and third diodes are reverse-biased to store energy in the second winding, and when the second switching transistor is switched off, said third diode is forward-biased to release the energy stored in the second winding into the third winding.

4. An energy transfer method using a transformer having first, second and third windings, and first, second and third capacitors respectively associated with the first, second third windings, comprising the steps of:

a) converting alternating-current energy to direct-current energy;

b) charging the first capacitor with said direct-current energy;

c) discharging the first capacitor through the first winding, inducing a current in the third winding to charge the third capacitor and storing energy in the first winding;

d) releasing the stored energy of the first winding into the second winding and charging the second capacitor with the released energy;

e) repeating steps (c) and (d) until the energy released by the first winding becomes insufficient to charge said second capacitor;

f) discharging the second capacitor through the secondary winding and storing energy on the second winding;

g) releasing the stored energy of the second winding into the third winding and charging the third capacitor;

h) repeating steps (f) and (g) until energy stored in the first capacitor becomes sufficient to cause the first winding to release sufficient energy into the second winding to charge said second capacitor; and i) repeating steps (c) to (h).

5. In a power supply unit comprising:

a rectifier for converting alternating-current energy to direct-current energy;

a transformer having a first winding wound in a first direction, a second winding wound in a second direction opposite to the first direction, and a third winding wound in the first direction;

first, second and third diodes connected to said first, second and third windings, respectively; and first, second and third capacitors connected to said first, second and third diodes, respectively, said first capacitor being charged with the direct-current energy, a method comprising the steps of:

a) producing a current from the first capacitor to the first winding, forward-biasing the third diode to induce a current in the third winding to charge the third capacitor and reverse-biasing the second diode;

b) forward-biasing the second diode to release energy stored in the first winding into the second winding to charge the second capacitor;

c) repeating steps (a) and (b) until the energy released in the second winding becomes insufficient to charge the second capacitor;

d) producing a current from the second capacitor to the second winding and reverse-biasing the first and third diodes to store energy in the second winding;

f) forward-biasing the third diode to release the stored energy of the second winding into the third winding to charge the third capacitor; and g) repeating steps (d) and (f) until energy stored in the first capacitor becomes sufficient to cause the first winding to release sufficient energy into the second winding to charge said second capacitor.

* * * * *